US012709179B2

(12) United States Patent
Kim

(10) Patent No.: US 12,709,179 B2
(45) Date of Patent: Aug. 18, 2026

(54) SYSTEM AND METHOD FOR PROVIDING INFORMATION ON AVAILABLE CHARGING STATIONS BASED ON DTE

(71) Applicants: HYUNDAI MOTOR COMPANY, Seoul (KR); KIA CORPORATION, Seoul (KR)

(72) Inventor: Han Shik Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 822 days.

(21) Appl. No.: 18/110,200

(22) Filed: Feb. 15, 2023

(65) Prior Publication Data

US 2024/0051422 A1 Feb. 15, 2024

(30) Foreign Application Priority Data

Aug. 11, 2022 (KR) ........................ 10-2022-0100930

(51) Int. Cl.
*H01M 10/44* (2006.01)
*B60L 53/66* (2019.01)
*B60L 58/12* (2019.01)
*G01C 21/34* (2006.01)
*H01M 10/46* (2006.01)

(52) U.S. Cl.
CPC ............... *B60L 53/66* (2019.02); *B60L 58/12* (2019.02); *G01C 21/3469* (2013.01); *B60L 2240/60* (2013.01)

(58) Field of Classification Search
CPC . H02J 7/0042; H02J 7/002; H02J 7/00; B60L 53/66; B60L 2240/60; B60L 53/67; B60L 2260/52; B60L 53/60; Y02T 90/12; Y02T 90/16
USPC ......................... 320/104, 107, 109, 132, 149
See application file for complete search history.

(56) References Cited

U.S. PATENT DOCUMENTS 8,577,528 B2 * 11/2013 Uyeki ..................... B60L 53/65 320/109
8,768,624 B2 * 7/2014 Kobayashi ............ B60L 53/305 701/410
11,836,131 B1 * 12/2023 Gronowski ........ G01C 21/3841
2009/0082957 A1 * 3/2009 Agassi .................... B60L 53/65 701/532
2015/0226566 A1 * 8/2015 North .................... H02J 7/0047 701/428
2020/0126322 A1 * 4/2020 Kimura ................... G06F 16/29

FOREIGN PATENT DOCUMENTS

EP 2437031 A1 * 4/2012 .............. B60L 53/64

* cited by examiner

*Primary Examiner* — Edward Tso
(74) *Attorney, Agent, or Firm* — Lempia Summerfield Katz LLC

(57) ABSTRACT

A vehicle charging control system and a method therefor are provided. The vehicle charging control system includes a vehicle that identifies whether a distance to empty (DTE) is changed based on charging at a location of a first charging station among at least one charging station. The vehicle transmits state information of the first charging station, which is obtained based on whether the DTE is changed, through a communication module. The system also includes a server that receives the state information of the first charging station from the vehicle and notifies the vehicle of whether the first charging station is available based on the state information of the first charging station.

18 Claims, 6 Drawing Sheets

SYSTEM AND METHOD FOR PROVIDING INFORMATION ON AVAILABLE CHARGING STATIONS BASED ON DTE

CROSS-REFERENCE TO RELATED APPLICATION

This application claims the benefit of priority to Korean Patent Application No. 10-2022-0100930, filed in the Korean Intellectual Property Office on Aug. 11, 2022, the entire contents of which are incorporated herein by reference.

TECHNICAL FIELD

The present disclosure relates to a vehicle charging control system and a method therefor, and more particularly, relates to technologies of providing information of a charging station, which is updated in real time.

BACKGROUND

Recently, as the popularity of eco-friendly vehicles including electric vehicles, hydrogen vehicles, and the like, has been expanded, technologies for providing charging station information to the eco-friendly vehicles have been developed.

The charging station information may include a charging station location, charger state information, or the like. It is common for charging station installers to provide charging station information, but the reality is that real-time charging station information may not be provided due to cost limitations.

Thus, when receiving charging station information that is not updated in real-time in a state where the vehicle does not have much distance to empty (DTE) left, it is difficult for the vehicle to perform smooth charging. When driving of the vehicle is impossible, it is inconvenient for the user.

SUMMARY

The present disclosure has been made to solve the above-mentioned problems occurring in the prior art while advantages achieved by the prior art are maintained.

An aspect of the present disclosure provides a vehicle charging control system for quickly updating state information of a charging station and notifying a driver of the updated state information and a method therefor.

Another aspect of the present disclosure provides a vehicle charging control system for quickly updating location information of an available charging station and notifying a driver of the updated location information and a method therefor.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a vehicle charging control system may include a vehicle that identifies whether a distance to empty (DTE) is changed based on charging at a location of a first charging station among at least one charging station and transmits state information of the first charging station. The state information is obtained based on whether the DTE is changed through a communication module. The vehicle charging control system may also include a server that receives the state information of the first charging station from the vehicle and notifies the vehicle of whether the first charging station is available based on the state information of the first charging station.

In an embodiment, the state information of the first charging station may include information indicating that it is impossible to perform charging at the first charging station, when the DTE is changed. The state information of the first charging station may include information indicating that it is impossible to perform charging at the first charging station, when the DTE is not changed.

In an embodiment, the server may include a memory storing a charging station location information list, may receive state information of the at least one charging station from the vehicle, and may update the charging station location information list, based on the received state information of the at least one charging station.

In an embodiment, the server may include a memory storing a charging station location information list and may hide location information of the first charging station in the charging station location information list. The server may do so when it is determined that the first charging station included in the charging station location information list is unavailable and when the number of vehicles visiting the first charging station is greater than or equal to a first threshold.

In an embodiment, the first threshold may be adjusted to be less than a threshold when the first charging station is a charging station at which the server obtains state information in real time, when the first charging station is a charging station at which the server does not obtain the state information in real time.

In an embodiment, the server may include a memory storing a charging station location information list and may determine that there is an available second charging station at a location where the DTE of the vehicle is changed. The server may do so when the DTE is changed at a location which is not included in the charging station location information list.

In an embodiment, the server may register location information of the available second charging station with the charging station location information list. The server may do so when the number of vehicles charged at the available second charging station is greater than or equal to a second threshold.

In an embodiment, the vehicle may obtain the state information of the first charging station based on the result of comparing a DTE when the charging is started at the first charging station, after arriving at the first charging station, with a DTE when the charging is completed at the first charging station, when a destination or a waypoint is set to the first charging station.

In an embodiment, the state information of the first charging station may include information indicating that it is impossible to perform charging at the first charging station when the vehicle moves to a charging station different from the first charging station, after the vehicle arrives at the first charging station, when a destination or a waypoint is set to the first charging station.

In an embodiment, the server may perform control such that the first charging station is found by use of at least one of audio video navigation telematics (AVNT), telematics, an application, or a combination thereof. The server may do so when it is determined that the first charging station is available. The server may also perform control such that the first charging station is not found by use of the at least one of the AVNT, the telematics, the application, or the combination thereof. The server may do so when it is determined that the first charging station is unavailable.

According to another aspect of the present disclosure, a vehicle charging control method may include identifying, by a vehicle, that a distance to empty (DTE) is changed based on charging at a location of a first charging station among at least one charging station. The method may also include transmitting, by the vehicle, state information of the first charging station, the state information being obtained based on whether the DTE is changed, to a server through a communication module. The method may also include receiving, by the server, the state information of the first charging station from the vehicle. The method may further include notifying, by the server, the vehicle of whether the first charging station is available based on the state information of the first charging station.

In an embodiment, the state information of the first charging station may include information indicating that it is possible to perform charging at the first charging station, when the DTE is changed. The state information of the first charging station may include information indicating that it is impossible to perform charging at the first charging station, when the DTE is not changed.

In an embodiment, the vehicle charging control method may further include receiving, by the server, state information of the at least one charging station from the vehicle. The method may also include updating, by the server, a charging station location information list stored in a memory included in the server, based on the received state information of the at least one charging station.

In an embodiment, the vehicle charging control method may further include hiding, by the server, location information of the first charging station in a charging station location information list stored in a memory included in the server. The method may include doing so when it is determined that the first charging station included in charging station location information list is unavailable and when the number of vehicles visiting the first charging station is greater than or equal to a first threshold.

In an embodiment, the first threshold may be adjusted to be less than a threshold when the first charging station is a charging station at which the server obtains state information in real time. The first threshold may be adjusted when the first charging station is a charging station at which the server does not obtain the state information in real time.

In an embodiment, the vehicle charging control method may further include determining, by the server, that there is an available second charging station at a location where the DTE of the vehicle is changed. The method may include doing so when the DTE is changed at a location which is not included in a charging station location information list stored in a memory included in the server.

In an embodiment, the vehicle charging control method may further include registering, by the server, location information of the available second charging station with the charging station location information list, when the number of vehicles charged at the available second charging station is greater than or equal to a second threshold.

In an embodiment, the vehicle charging control method may further include obtaining, by the vehicle, the state information of the first charging station based on the result of comparing a DTE when the charging is started at the first charging station, after the vehicle arrives at the first charging station, with a DTE when the charging is completed at the first charging station, when a destination or a waypoint is set to the first charging station.

In an embodiment, the state information of the first charging station may include information indicating that it is impossible to perform charging at the first charging station when the vehicle moves to a charging station different from the first charging station, after the vehicle arrives at the first charging station, when a destination or a waypoint is set to the first charging station.

In an embodiment, the vehicle charging control method may further include controlling, by the server, such that the first charging station is found by use of at least one of AVNT, telematics, an application, or a combination thereof, when it is determined that the first charging station is available. The method may also include controlling, by the server, such that the first charging station is not found by use of the at least one of the AVNT, the telematics, the application, or the combination thereof, when it is determined that the first charging station is unavailable.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
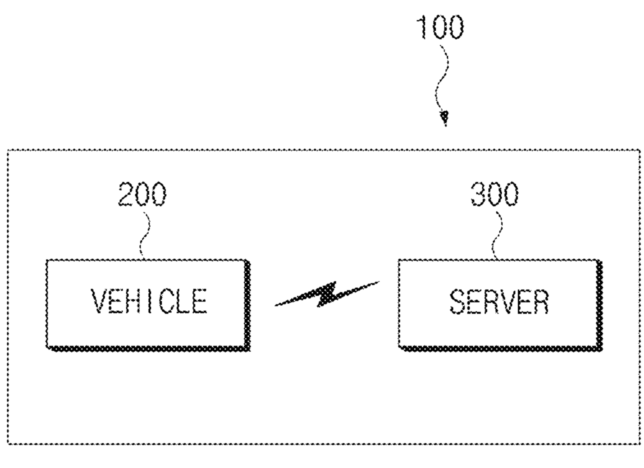
FIG. 1 is a block diagram of a vehicle charging control system according to an embodiment of the present disclosure.

Hereinafter, some embodiments of the present disclosure are described in detail with reference to the drawings. In the drawings, the same reference numerals are used throughout to designate the same or equivalent elements. In addition, a detailed description of well-known features or functions has been omitted out in order not to unnecessarily obscure the gist of the present disclosure. When a component, device, element, or the like of the present disclosure is described as having a purpose or performing an operation, function, or the like, the component, device, or element should be considered herein as being "configured to" meet that purpose or perform that operation or function.

In describing the components of the embodiments according to the present disclosure, terms such as "first," "second," "A," "B," "(a)," "(b)," and the like, may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings consistent with the contextual meanings in the relevant field of art. Such terms are not to be interpreted as having ideal or excessively formal meanings unless clearly defined as having such in the present application.

Hereinafter, embodiments of the present disclosure are described in detail with reference to FIGS. 1-6.

FIG. 1 is a block diagram of a vehicle charging control system 100 according to an embodiment of the present disclosure.

Referring to FIG. 1, the vehicle charging control system 100 according to an embodiment may include a vehicle 200 and a server 300. In various embodiments, the vehicle charging control system 100 may include an additional component other than the components shown in FIG. 1 or may omit at least one of the components shown in FIG. 1.

Hereinafter, a car or a vehicle described in the present disclosure refers to an electric vehicle (EV), but the description of the car or the vehicle does not exclude cars or vehicles which perform various types of charging other than a plug-in hybrid electric vehicle (PHEV) and a fuel cell electric vehicle (FCEV).

In the present disclosure, the vehicle 200 may include a plurality of vehicles, which communicate with the server 300.

According to an embodiment, the vehicle 200 may identify whether a distance to empty (DTE) is changed based on charging at a location of at least one charging station.

According to an embodiment, the vehicle 200 may manage battery management system (BMS) state information in the vehicle 200.

According to an embodiment, the vehicle 200 may identify information about a change in a battery state of charge (SoC) and/or a DTE by means of a BMS.

For example, when selecting a charging station as a waypoint or a destination and arriving at the waypoint or the destination, the vehicle 200 may obtain state information of the charging station based on identifying information about a change in SoC by means of the BMS.

According to an embodiment, the vehicle 200 may transmit the state information of the charging station, which is obtained based on whether the DTE is changed, to the server 300 through its communication module.

For example, the state information of the charging station may include a charging station name, a charging station location, information indicating whether a charger in the charging station is available, or the like.

According to an embodiment, the server 300 may receive the state information of the charging station from the vehicle 200.

According to an embodiment, the server 300 may notify the vehicle 200 of whether the charging station is available, based on the state information of the charging station.

Figure 2:
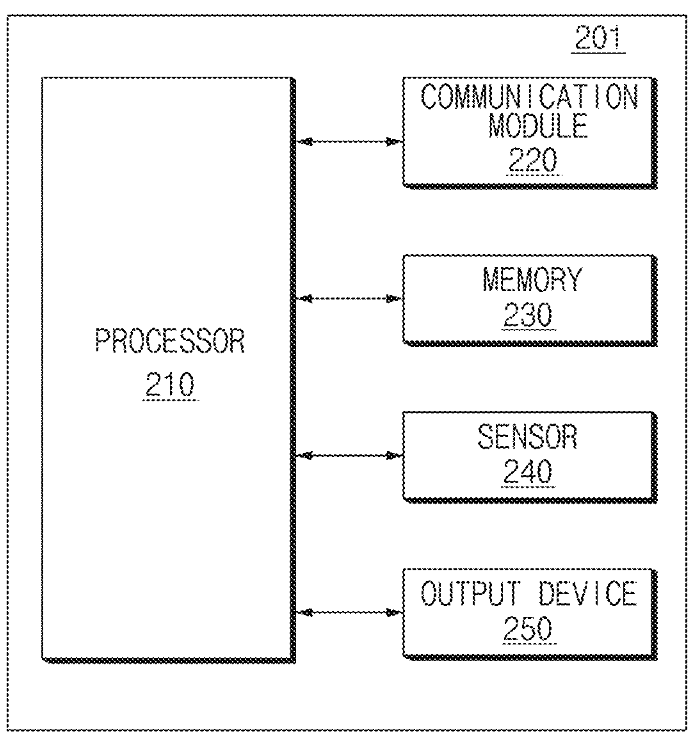
FIG. 2 is a block diagram of a vehicle according to an embodiment of the present disclosure.

FIG. 2 is a block diagram of a vehicle 201 according to an embodiment of the present disclosure.

Referring to FIG. 2, the vehicle 201 according to an embodiment may include a processor 210, a communication module 220, a memory 230, a sensor 240, and an output device 250. In various embodiments, the vehicle 201 may include an additional component other than the components shown in FIG. 2 or may omit at least one of the components shown in FIG. 2.

The processor 210 may include, for example, an electronic control unit (ECU), a microcontroller unit (MCU), or another sub-controller, which is loaded into the vehicle 201.

According to an embodiment, the processor 210 may execute calculation and data processing about control and/or communication of at least one other component of the vehicle 201 using instructions stored in the memory 230.

According to an embodiment, the processor 210 may control DTE information output through the output device 250.

According to an embodiment, the processor 210 may be implemented by various processing devices, such as a microprocessor, embedding a semiconductor chip, or the like, capable of calculating or executing various commands. The processor also may control an operation of the vehicle 201 according to various embodiments of the present disclosure.

According to an embodiment, the processor 210 may calculate a DTE based on the SoC or the amount of remaining fuel. When charging proceeds, the processor 210 may determine whether the DTE of the vehicle 201 is changed.

According to an embodiment, when it is determined that the DTE is not changed after the charging proceeds, the processor 210 may determine that it is impossible to perform charging at a charging station. When it is determined that it is impossible to perform the charging at the charging station, the processor 210 may transmit information indicating that it is impossible to perform the charging at the charging station to a server.

According to an embodiment, when it is determined that the DTE is changed after the charging proceeds, the processor 210 may determine that it is possible to perform charging at the charging station. When it is determined that it is possible to perform the charging at the charging station, the processor 210 may transmit information indicating that it is possible to perform the charging at the charging station to the server.

According to an embodiment, when the processor 210 is notified that the charging station is unavailable from the server or when the processor 210 is notified that the charging station is available from the server, it may output the notified information through the output device 250. In addition, the processor 210 may receive information in real time from the server to update a route to a destination.

The communication module 220 may communicate with the server in various wireless communication schemes such as wireless fidelity (Wi-Fi), wireless broadband (WiBro), global system for mobile communication (GSM), code division multiple access (CDMA), wideband CDMA (WCDMA), universal mobile telecommunication system (UMTS), time division multiple access (TDMA), and long-term evolution (LTE).

The memory 230 may store at least one algorithm which calculates or executes various commands for an operation of the vehicle 201 according to an embodiment of the present disclosure. The memory 230 may include at least one of a flash memory, a hard disc, a memory card, a read-only memory (ROM), a random-access memory (RAM), an electrically erasable and programmable ROM (EEPROM), a programmable ROM (PROM), a magnetic memory, a magnetic disc, an optical disc, or a combination thereof.

According to an embodiment, the sensor 240 may sense a state of the vehicle 201. According to an embodiment, the sensor 240 may include a battery sensor or a fuel sensor and may sense a SoC of the vehicle 201, i.e., the battery, or an amount of remaining fuel of the vehicle 201.

According to an embodiment, the output device 250 may output information, received from the server, to a user in at least one of a visual manner or an audible manner.

According to an embodiment, the output device 250 may include a display device, which outputs an image. The display device may include a display of navigation (not shown), a head-up display (HUD), an instrument cluster, or the like.

According to an embodiment, the output device 250 may include a sound output device which outputs a sound. The sound output device may include a speaker.

Figure 3:
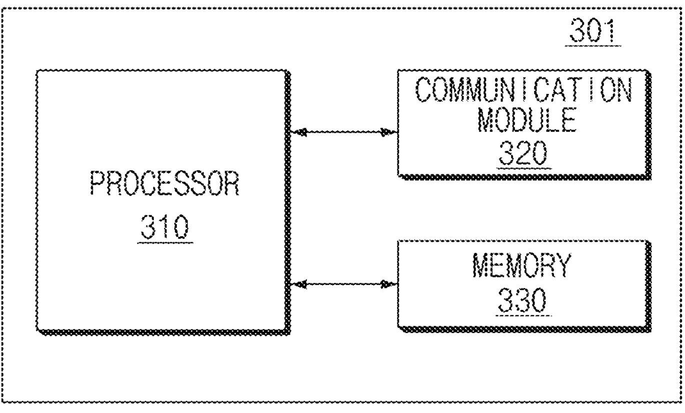
FIG. 3 is a block diagram of a server according to an embodiment of the present disclosure.

FIG. 3 is a block diagram of a server 301 according to an embodiment of the present disclosure.

Referring to FIG. 3, the server 301 according to an embodiment may include a processor 310, a communication module 320, and a memory 330. In various embodiments, the server 301 may include an additional component other than the components shown in FIG. 3 or may omit at least one of the components shown in FIG. 3.

According to an embodiment, the processor 310 may be implemented by various processing devices, such as a microprocessor, embedding a semiconductor chip, or the like, capable of calculating or executing various commands, and may control an operation of the server 301 according to an embodiment of the present disclosure.

According to an embodiment, when receiving state information of a charging station from a vehicle, the processor 310 may determine whether the charging station is available based on the state information of the charging station.

According to an embodiment, when it is determined that the charging station is available based on the state information of the charging station, the processor 310 may notify the vehicle that the charging station is available.

According to an embodiment, the processor 310 may notify the vehicle that the charging station is available through the communication module 320.

According to an embodiment, when it is determined that the charging station is unavailable based on the state information of the charging station, the processor 310 may notify the vehicle that the charging station is unavailable.

According to an embodiment, the processor 310 may notify the vehicle that the charging station is unavailable through the communication module 320.

The communication module 320 may communicate with a vehicle 200 of FIG. 1 and a portable terminal (not shown) in various wireless communication schemes such as wireless fidelity (Wi-Fi), wireless broadband (WiBro), global system for mobile communication (GSM), code division multiple access (CDMA), wideband CDMA (WCDMA), universal mobile telecommunication system (UMTS), time division multiple access (TDMA), and long-term evolution (LTE).

The memory 330 may store at least one algorithm, which calculates or executes various commands for an operation of the vehicle 201 according to an embodiment of the present disclosure. The memory 330 may include at least one of a flash memory, a hard disc, a memory card, a read-only memory (ROM), a random access memory (RAM), an electrically erasable and programmable ROM (EEPROM), a programmable ROM (PROM), a magnetic memory, a magnetic disc, an optical disc, or a combination thereof.

According to an embodiment, the memory 330 may store a charging station location information list. For example, the charging station location information list may include at least one electric vehicle charging station location. However, the present disclosure is not limited thereto. The charging station location information list may include at least one charging station location capable of performing various types of charging.

Figure 4:
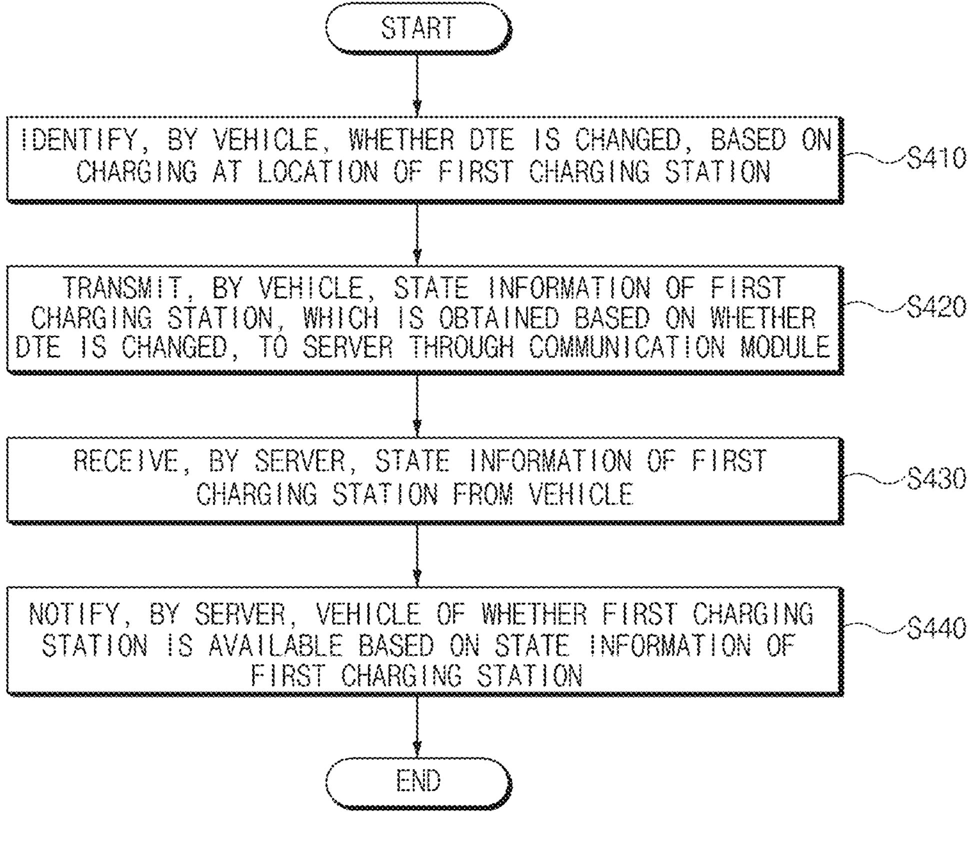
FIG. 4 is a flowchart illustrating a vehicle charging control method according to an embodiment of the present disclosure.

FIG. 4 is a flowchart illustrating a vehicle charging control method according to an embodiment of the present disclosure.

Operations in S410 to S440 in an embodiment below may be sequentially performed but are not necessarily sequentially performed. For example, an order of the respective operations may be changed, and at least two operations may be performed in parallel.

Referring to FIG. 4, in the vehicle charging control method according to an embodiment, in operation S410, a vehicle may identify whether a DTE is changed based on charging at a location of a first charging station among at least one charging station.

According to an embodiment, the vehicle may calculate a DTE based on a SoC or an amount of remaining fuel.

According to an embodiment, the vehicle may identify whether the DTE is changed by means of a BMS, at the location of the first charging station among the at least one charging station.

According to an embodiment, when normally charged at the first charging station, the vehicle may identify that the DTE is changed.

According to an embodiment, when not normally charged at the first charging station, the vehicle may identify that the DTE is not changed.

In the vehicle charging control method according to an embodiment, in operation S420, the vehicle may transmit state information of the first charging station, which is obtained based on whether the DTE is changed, to a server through its communication module.

According to an embodiment, the vehicle may obtain state information of the first charging station, based on whether the DTE is changed at the first charging station.

According to an embodiment, the state information of the first charging station may include at least one of information about it is possible to perform charging at the first charging station, a name of the first charging station, a location of the first charging station, or a combination thereof.

For example, when the DTE is changed, the vehicle may obtain state information of the first charging station, including information indicating that it is possible to perform charging at the first charging station.

For another example, when the DTE is not changed, the vehicle may obtain state information of the first charging station, including information indicating that it is impossible to perform charging at the first charging station.

According to an embodiment, the vehicle may transmit the state information of the first charging station to the server through the communication module.

In the vehicle charging control method according to an embodiment, in operation S430, the server may receive the state information of the first charging station from the vehicle.

According to an embodiment, the server may receive the state information of the first charging station, including whether it is possible to perform charging at the first charging station, from the vehicle.

According to an embodiment, the server may include a memory which stores a charging station location information list.

According to an embodiment, the server may receive the state information of the first charging station from the vehicle and may update the charging station location information list, based on the received state information of the first charging station.

For example, when it is determined that the first charging station included in the charging station location information list is unavailable, the server may hide location information of the first charging station in the charging station location information list.

For another example, when the location of the first charging station in which the DTE of the vehicle is changed is not included in the charging station location information list, the server may register the location information of the first charging station with the charging station location information list.

In the vehicle charging control method according to an embodiment, in operation S440, the server may notify the vehicle of whether the first charging station is available based on the state information of the first charging station.

According to an embodiment, when it is determined that the first charging station is available, based on the state information of the first charging station, the server may control such that the first charging station is found by means or use of at least one of AVNT, telematics, an application, or a combination thereof. For example, the telematics may include Hyundai Blue Link service.

According to an embodiment, when it is determined that the first charging station is unavailable, based on the state information of the first charging station, the server may control such that the first charging station is not found by means of the at least one of the AUNT, the telematics, the application, or the combination thereof.

Figure 5:
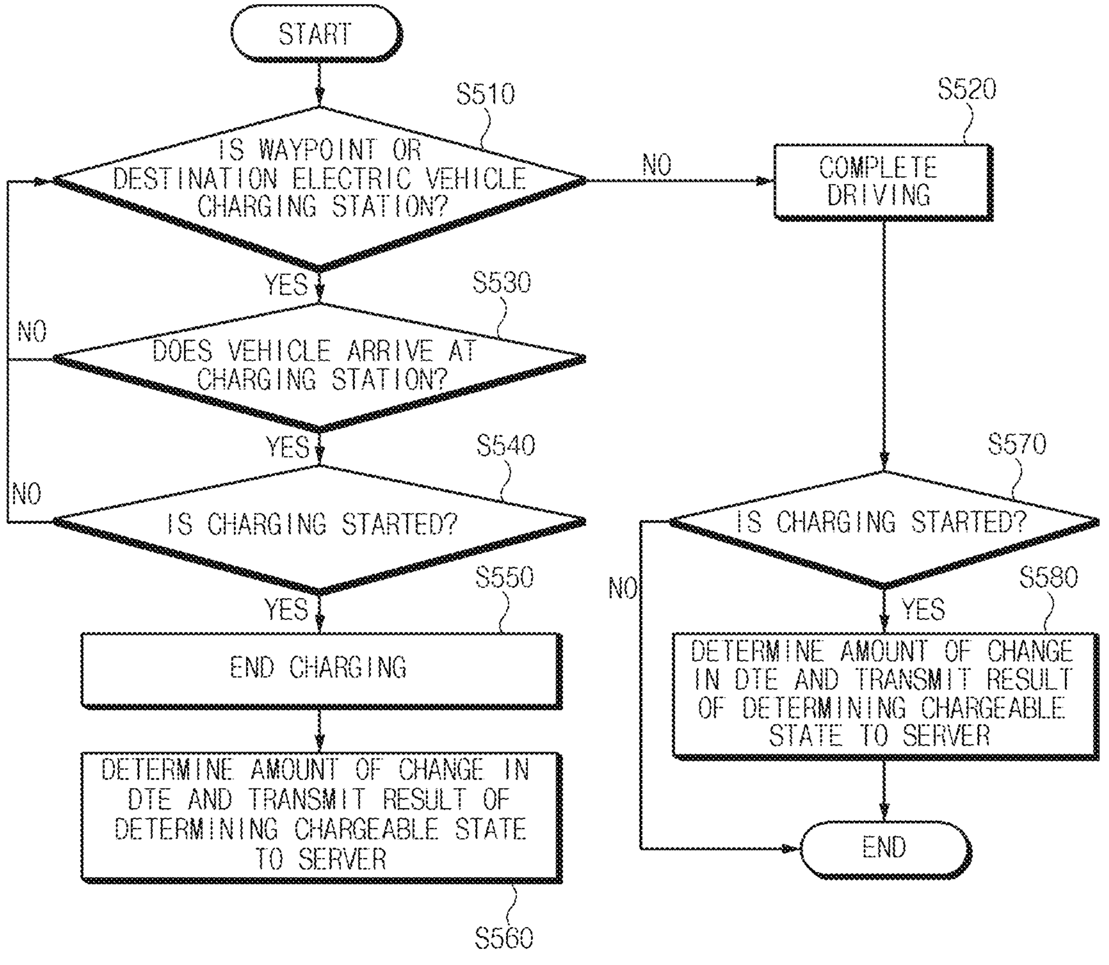
FIG. 5 is a flowchart illustrating contents for updating state information of a charging station in a vehicle charging control system and a vehicle charging control method according to an embodiment of the present disclosure.

FIG. 5 is a flowchart illustrating contents for updating state information of a charging station in a vehicle charging control system and a vehicle charging control method according to an embodiment of the present disclosure.

Operations in S510 to S580 in an embodiment below may be sequentially performed but are not necessarily sequentially performed. For example, an order of the respective operations may be changed, and at least two operations may be performed in parallel.

Referring to FIG. 5, in the vehicle charging control system and the vehicle charging control method according to an embodiment, in operation S510, a vehicle may determine whether a waypoint or a destination is set to a charging station.

According to an embodiment, the vehicle may determine whether the destination or the waypoint is set (or input) to (or as) a charging station (e.g., an electric vehicle charging station).

According to an embodiment, when it is determined that the waypoint or the destination is set to the charging station (Yes in S510), in operation S530, the vehicle may determine whether the vehicle arrives at the charging station.

According to an embodiment, when it is determined that the waypoint or the destination is set to the charging station, the vehicle may determine whether the vehicle arrives at the charging station, based on the location of the vehicle.

According to an embodiment, when it is determined that the vehicle does not arrive at the charging station (No in S530), the vehicle may return to operation S510.

According to an embodiment, when it is determined that the vehicle arrives at the charging station (Yes in S530), in operation S540, the vehicle may determine whether the charging of the vehicle is started.

According to an embodiment, after arriving at the charging station, the vehicle may determine whether the charging of the vehicle is started, based on an SoC or an amount of remaining fuel.

For example, when the SoC or the amount of remaining fuel is changed, the vehicle may determine that the charging of the vehicle is started.

For another example, when the SoC or the amount of remaining fuel is not changed, the vehicle may determine that the charging of the vehicle is not started.

According to an embodiment, when it is determined that the charging of the vehicle is started (Yes in S540), in operation S550, the vehicle may identify that the charging of the vehicle is ended after a certain time elapses.

According to an embodiment, after it is determined that the charging of the vehicle is started, when the SoC or the amount of remaining fuel is not changed any longer, the vehicle may determine that the charging of the vehicle is ended.

According to an embodiment, when it is determined that the charging of the vehicle is not started (No in S540), the vehicle may return to operation S510.

According to an embodiment, after the vehicle arrives at the charging station, when the vehicle moves to another charging station, the vehicle may determine that the charging station of the vehicle is not started.

According to an embodiment, after the charging is ended, in operation S560, the vehicle may determine an amount of change in DTE and may transmit the result of determining a chargeable state of the charging station to the server.

According to an embodiment, the vehicle may calculate an amount of change in DTE, based on the result of comparing a DTE when the charging is started at the charging station with a DTE when the charging is completed at the charging station.

According to an embodiment, when it is determined that the DTE is changed, the vehicle may determine that the charging station is in a chargeable state.

According to an embodiment, when it is determined that the DTE is changed, the vehicle may transmit the result that the charging station is in the chargeable state to the server.

According to an embodiment, when it is determined that the DTE is not changed, the vehicle may determine that the charging station is in a non-chargeable state.

According to an embodiment, when it is determined that the DTE is not changed, the vehicle may transmit the result that the charging station is in the non-chargeable state to the server.

According to an embodiment, the server may include a memory which stores a charging station location information list. When it is determined that a charging station (e.g., a first charging station) included in the charging station location information list is unavailable and when the number of vehicles which visit the charging station (e.g., the first charging station) is greater than or equal to a first threshold, the server may hide location information of the charging station (e.g., the first charging station) in the charging station location information list.

According to an embodiment, the first threshold may be adjusted. According to an embodiment, when the charging station (e.g., the first charging station) is a charging station at which the server does not obtain state information in real time, the first threshold may be adjusted to be less than a threshold when the charging station (e.g., the first charging station) is a charging station at which the server obtains the state information in real time.

According to an embodiment, the server may perform control such that the charging station (e.g., the first charging station) is not found by means of at least one of AUNT, telematics, an application, or a combination thereof.

According to an embodiment, when it is determined that the waypoint or the destination is not set to the charging station (No in S510), in operation S520, the vehicle may determine whether driving is completed.

According to an embodiment, when it is determined that the waypoint or the destination is not set to the charging station, the vehicle may determine whether the driving is completed, based on the driving state of the vehicle.

According to an embodiment, when the driving is completed, in operation S570, the processor may determine whether charging is started.

According to an embodiment, after the driving is completed, the vehicle may determine whether the charging is started, based on an SoC or an amount of remaining fuel.

For example, when the SoC or the amount of remaining fuel is changed, the vehicle may determine that the charging of the vehicle is started.

For another example, when the SoC or the amount of remaining fuel is not changed, the vehicle may determine that the charging of the vehicle is not started.

According to an embodiment, when it is determined that the charging of the vehicle is started (Yes in S570), in operation S580, the vehicle may determine an amount of change in DTE after a certain time elapses and may transmit the result of determining a chargeable state to the server.

According to an embodiment, the vehicle may calculate an amount of change in DTE, based on the result of comparing a DTE when the charging is started after the driving is completed with a DTE when the charging is completed.

According to an embodiment, when it is determined that the DTE is changed, the vehicle may transmit the information that it is possible to perform charging at a location where the DTE is changed to the server.

According to an embodiment, the server may include a memory, which stores a charging station location information list. When the DTE of the vehicle is changed at a location that is not included in the charging station location information list, the server may determine that there is an available charging station (e.g., an available second charging station) at a location where the DTE is changed.

According to an embodiment, when the number of vehicles charged at the charging station (e.g., the available second charging station) is greater than or equal to a second threshold, the server may register location information of the charging station (e.g., the available second charging station) with the charging station location information list.

According to an embodiment, the server may notify the vehicle that the charging station (e.g., the available second charging station) is available.

According to an embodiment, the server may perform control such that the charging station (e.g., the available second charging station) is found by means or use of the at least one of the AUNT, the telematics, the application, or the combination thereof.

Figure 6:
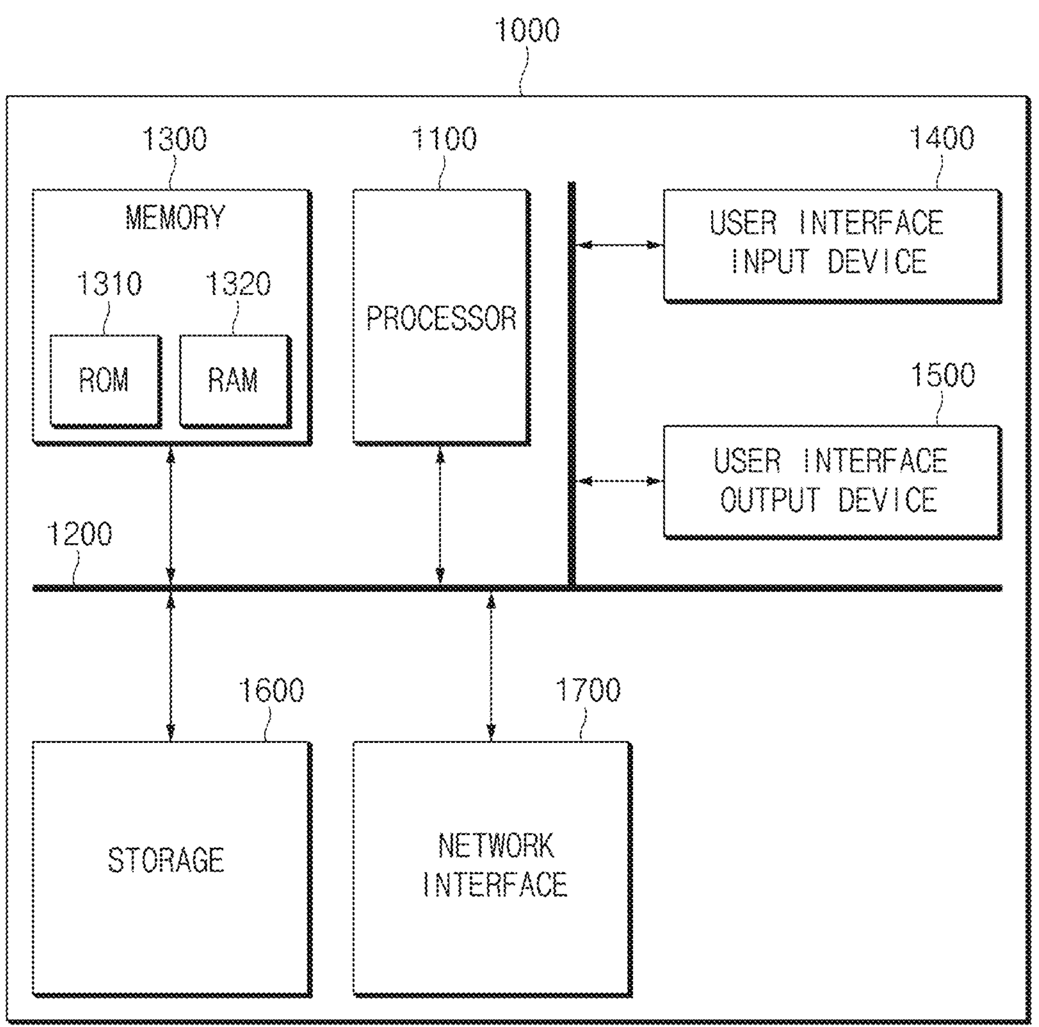
FIG. 6 illustrates a computing system about a vehicle charging control system and a method therefor according to an embodiment of the present disclosure.

FIG. 6 illustrates a computing system about a vehicle charging control system and a method therefor according to an embodiment of the present disclosure.

Referring to FIG. 6, a computing system 1000 about the vehicle charging control system and the method therefor may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (e.g., the memory 1300 and/or the storage 1600) such as a RAM, a flash memory, a ROM, an EPROM, an EEPROM, a register, a hard disc, a removable disk, and a compact disc ROM (CD-ROM).

The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description is given of effects of the vehicle charging control system and the method therefor according to an embodiment of the present disclosure.

According to at least one of the embodiments of the present disclosure, the vehicle charging control system may effectively manage a charging station capable of performing charging.

Furthermore, according to at least one of the embodiments of the present disclosure, the vehicle charging control system may guide the user along a route to search for a stable charging station.

Furthermore, according to at least one of the embodiments of the present disclosure, the vehicle charging control system may allow the vehicle to directly obtain charging information of a charging station using communication.

Furthermore, according to at least one of the embodiments of the present disclosure, the vehicle charging control system may allow the server to manage charging station information such that the user may receive updated state information of a charging station.

In addition, various effects ascertained directly or indirectly through the present disclosure may be provided.

Hereinabove, although the present disclosure has been described with reference to various embodiments and the accompanying drawings, the present disclosure is not limited thereto. The embodiments may be variously modified and altered by those having ordinary skill in the art to which the present disclosure pertains without departing from the spirit and scope of the present disclosure claimed in the following claims.

Therefore, embodiments of the present disclosure are not intended to limit the technical spirit of the present disclosure but are provided only for illustrative purposes. The scope of the present disclosure should be construed based on the accompanying claims, and all the technical ideas within the scope equivalent to the claims should be included in the scope of the present disclosure.

What is claimed is:

1. A vehicle charging control system, comprising:

a vehicle configured to identify whether a distance to empty (DTE) is changed based on charging at a location of a first charging station among at least one charging station and transmit state information of the first charging station, the state information being obtained based on whether the DTE is changed, through a communication module; and a server configured to receive the state information of the first charging station from the vehicle and notify the vehicle of whether the first charging station is available based on the state information of the first charging station, wherein the vehicle is further configured to:

determine a first DTE at a first timing, when the vehicle arrives at the first charging station;

determine a second DTE after a predetermined time has elapsed from the first timing at the first charging station; and determine that the first charging station is in a chargeable state based on the first DTE and the second DTE differing.

2. The vehicle charging control system of claim 1, wherein the state information of the first charging station includes information indicating that it is impossible to perform charging at the first charging station, when the DTE is changed, and the state information of the first charging station includes information indicating that it is impossible to perform charging at the first charging station, when the DTE is not changed.

3. The vehicle charging control system of claim 1, wherein the server includes a memory storing a charging station location information list, receives state information of the at least one charging station from the vehicle, and updates the charging station location information list, based on the received state information of the at least one charging station.

4. The vehicle charging control system of claim 1, wherein the server includes a memory storing a charging station location information list and hides location information of the first charging station in the charging station location information list, when it is determined that the first charging station included in the charging station location information list is unavailable and when a number of vehicles visiting the first charging station is greater than or equal to a first threshold.

5. The vehicle charging control system of claim 4, wherein the first threshold is adjusted to be less than a threshold when the first charging station is a charging station at which the server obtains state information in real time, when the first charging station is a charging station at which the server does not obtain the state information in real time.

6. The vehicle charging control system of claim 1, wherein the server includes a memory storing a charging station location information list and determines that there is an available second charging station at a location where the DTE of the vehicle is changed, when the DTE is changed at a specific location.

7. The vehicle charging control system of claim 6, wherein the server registers location information of the available second charging station with the charging station location information list, when a number of vehicles charged at the available second charging station is greater than or equal to a second threshold.

8. The vehicle charging control system of claim 1, wherein the state information of the first charging station includes information indicating that it is impossible to perform charging at the first charging station when the vehicle moves to a charging station different from the first charging station, after the vehicle arrives at the first charging station, when a destination or a waypoint is set to the first charging station.

9. The vehicle charging control system of claim 1, wherein the server controls such that the first charging station is found by use of at least one of audio video navigation telematics (AVNT), telematics, an application, or a combination thereof, when it is determined that the first charging station is available, and hides location information of the first charging station in a charging station location information list.

10. A vehicle charging control method, comprising:

identifying, by a vehicle, a distance to empty (DTE) is changed based on charging at a location of a first charging station among at least one charging station;

transmitting, by the vehicle, state information of the first charging station, the state information being obtained based on whether the DTE is changed to a server through a communication module;

receiving, by the server, the state information of the first charging station from the vehicle;

notifying, by the server, the vehicle of whether the first charging station is available based on the state information of the first charging station;

determining, by the vehicle, a first DTE at a first timing, when the vehicle arrives at the first charging station; and determining, by the vehicle, that the first charging station is in a chargeable state based on the first DTE and the second DTE differing.

11. The vehicle charging control method of claim 10, wherein the state information of the first charging station includes information indicating that it is possible to perform charging at the first charging station, when the DTE is changed, and the state information of the first charging station includes information indicating that it is impossible to perform charging at the first charging station, when the DTE is not changed.

12. The vehicle charging control method of claim 10, further comprising:

receiving, by the server, state information of the at least one charging station from the vehicle; and updating, by the server, a charging station location information list stored in a memory included in the server, based on the received state information of the at least one charging station.

13. The vehicle charging control method of claim 10, further comprising:

hiding, by the server, location information of the first charging station in a charging station location information list stored in a memory included in the server, when it is determined that the first charging station included in charging station location information list is unavailable and when a number of vehicles visiting the first charging station is greater than or equal to a first threshold.

14. The vehicle charging control method of claim 13, wherein the first threshold is adjusted to be less than a threshold when the first charging station is a charging station at which the server obtains state information in real time, when the first charging station is a charging station at which the server does not obtain the state information in real time.

15. The vehicle charging control method of claim 10, further comprising:

determining, by the server, that there is an available second charging station at a location where the DTE of the vehicle is changed, when the DTE is changed at a specific location.

16. The vehicle charging control method of claim 15, further comprising:

registering, by the server, location information of the available second charging station with the charging station location information list, when a number of vehicles charged at the available second charging station is greater than or equal to a second threshold.

17. The vehicle charging control method of claim 10, wherein the state information of the first charging station includes information indicating that it is impossible to perform charging at the first charging station when the vehicle moves to a charging station different from the first charging station, after the vehicle arrives at the first charging station, when a destination or a waypoint is set to the first charging station.

18. The vehicle charging control method of claim 10, further comprising:

controlling, by the server, such that the first charging station is found by use of at least one of audio video navigation telematics (AVNT), telematics, an application, or a combination thereof, when it is determined that the first charging station is available; and hiding, by the server, location information of the first charging station in a charging station location information list.

* * * * *